(12) United States Patent
Smith et al.

(10) Patent No.: US 7,913,177 B1
(45) Date of Patent: Mar. 22, 2011

(54) SYSTEM AND METHOD FOR MANAGING INSTANTIATION OF INTERFACE ELEMENTS IN RICH INTERNET APPLICATIONS

(75) Inventors: Albert Gordon Smith, San Francisco, CA (US); Glenn Warren Ruehle, Novato, CA (US); Eliot Greenfield, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1484 days.

(21) Appl. No.: 10/796,785

(22) Filed: Mar. 8, 2004

(51) Int. Cl.
*G06F 3/00* (2006.01)
*G06F 3/048* (2006.01)

(52) U.S. Cl. ........................ 715/762; 715/763

(58) Field of Classification Search ........... 715/762–763
See application file for complete search history.

(56) References Cited

U.S. PATENT DOCUMENTS

| | | | | |
|---|---|---|---|---|
| 5,515,487 | A * | 5/1996 | Beaudet et al. | 345/440 |
| 5,673,401 | A * | 9/1997 | Volk et al. | 725/139 |
| 6,178,432 | B1 * | 1/2001 | Cook et al. | 715/201 |
| 6,636,250 | B1 * | 10/2003 | Gasser | 715/853 |
| 6,941,521 | B2 * | 9/2005 | Lin et al. | 715/762 |
| 7,073,122 | B1 * | 7/2006 | Sedghi | 715/234 |
| 7,096,163 | B2 * | 8/2006 | Reghetti | 703/1 |
| 7,287,018 | B2 * | 10/2007 | Lennon | 707/694 |
| 7,559,034 | B1 * | 7/2009 | Paperny et al. | 715/803 |
| 2002/0085028 | A1 * | 7/2002 | Tabatabai et al. | 345/748 |
| 2002/0156814 | A1 * | 10/2002 | Ho | 707/514 |
| 2003/0001893 | A1 * | 1/2003 | Haley | 345/762 |
| 2003/0172345 | A1 * | 9/2003 | Engelsberg et al. | 715/501.1 |
| 2003/0184585 | A1 * | 10/2003 | Lin et al. | 345/763 |
| 2004/0111673 | A1 * | 6/2004 | Bowman et al. | 715/513 |
| 2004/0122789 | A1 * | 6/2004 | Ostertag et al. | 707/1 |
| 2004/0230900 | A1 * | 11/2004 | Relyea et al. | 715/513 |
| 2006/0200535 | A1 * | 9/2006 | Moser | 709/217 |

OTHER PUBLICATIONS

Matias Urbieta, Gustavo Rossi, Jeronimo Ginzburg, Designing the Interface of Rich Internet Applications, Fifth Latin American Web Congress, 2007, IEEE, pp. 144-153.*

* cited by examiner

*Primary Examiner* — William L Bashore
*Assistant Examiner* — Ashraf Zahr
(74) *Attorney, Agent, or Firm* — Kilpatrick Townsend & Stockton LLP

(57) ABSTRACT

A system and method are described for managing instantiation of interface elements in a rich Internet application (RIA) that includes systematically creating a tree of descriptive nodes that describe the visual interface elements of the application. Only interface elements that are not stacked under other objects or not fully hidden on the screen are instantiated using the corresponding descriptive nodes. Detail objects corresponding to the descriptive nodes are then constructed and used by a rendering engine to render the visual interface elements of the declarative application. As the user moves to locations within the application that are stacked under other objects or are hidden, the descriptive nodes and detailed objects are created representing the interface elements of those locations for rendering by the rendering engine.

19 Claims, 5 Drawing Sheets

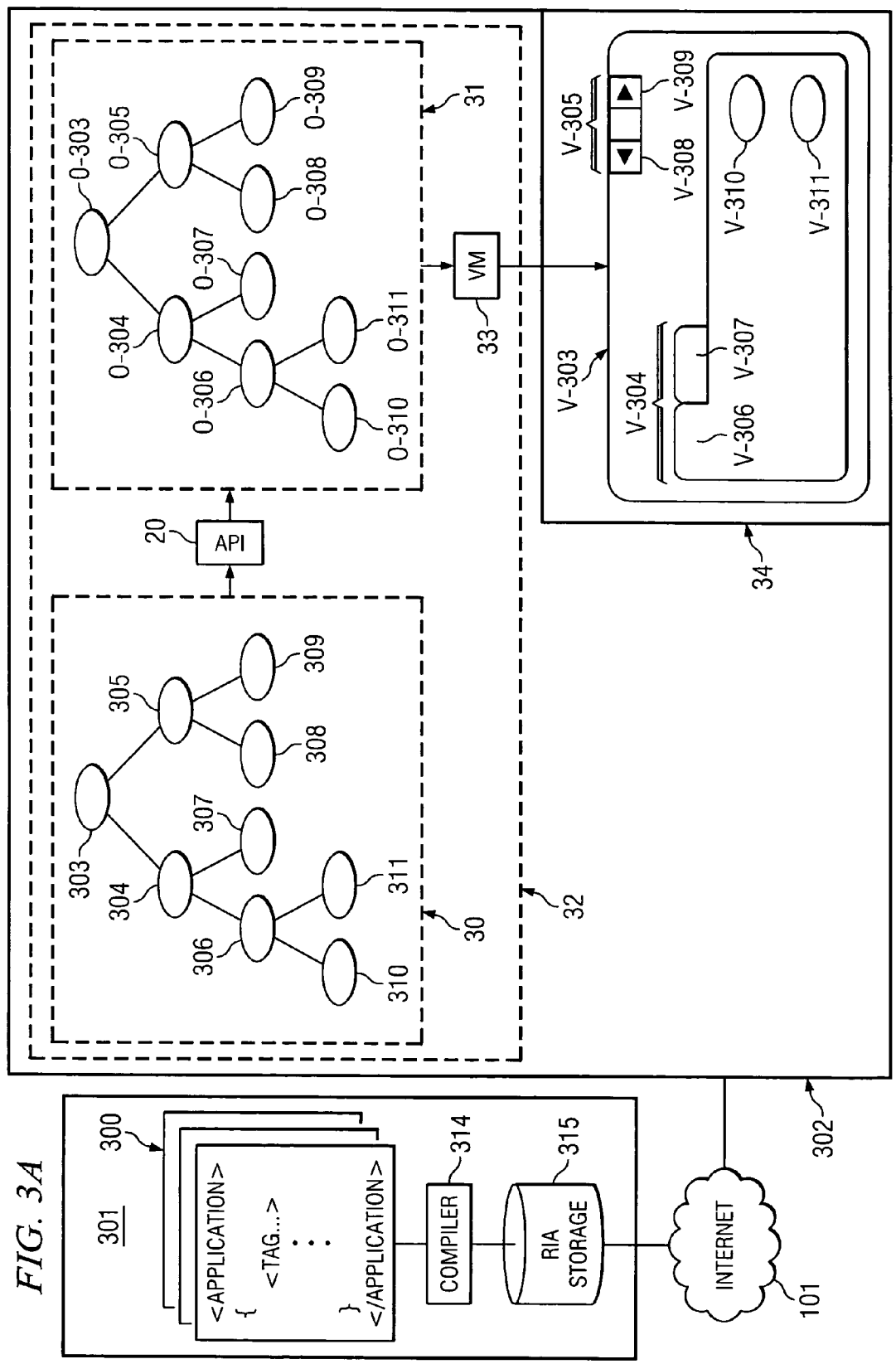

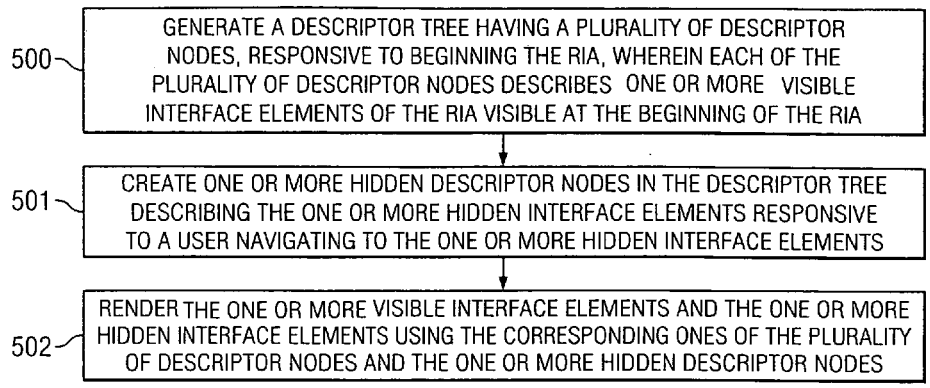
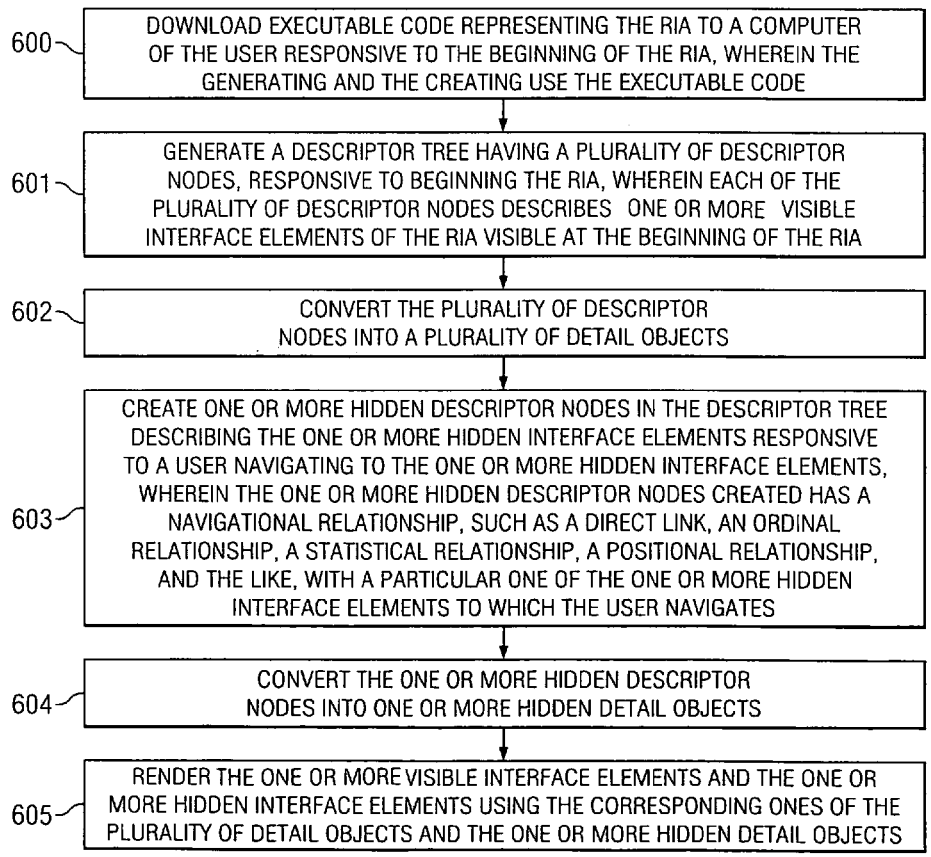

SYSTEM AND METHOD FOR MANAGING INSTANTIATION OF INTERFACE ELEMENTS IN RICH INTERNET APPLICATIONS

TECHNICAL FIELD

The present invention relates, in general, to rich Internet applications (RIAs), and, more specifically, to the deferred instantiation of interface elements in RIAs.

BACKGROUND OF THE INVENTION

Over the last ten years, computers and computing technology have grown in leaps and bounds due, in no small part, to the growth and reach of the Internet. Computer applications, once written in procedural programming languages and mostly self-contained on each computer desktop, now are increasingly being written to include non-procedural programming languages with regular interaction across a data network, such as the Internet, for retrieving, not only data, but application logic as well.

Procedural languages, such as C/C++, FORTRAN, MICROSOFT CORPORATION'S VISUAL BASIC™, and the like, implement application functionality through properly ordered steps and actions. In contrast, non-procedural languages, such as Hypertext Markup Language (HTML), MACROMEDIA, INC.'s MXML™, which is a specialized, XML-based language for developing RIAs in MACROMEDIA, INC.s' FLEX™ development environment, and the like, define the final appearance of an application's user interface without specifying a time-based sequence of steps for constructing that interface. These non-procedural languages, also known as declarative languages, are extensively used in Internet technology. Web pages are defined by the underlying HTML. When a browser requests a Web page, the entire page is defined. In typical RIA, procedural languages may be used to define the programming logic, while the non-procedural languages are used to define the visual interface elements.

RIAs are one area in which the growth of declarative applications has coupled with a growth in Internet or network interaction. RIAs combine the usability of a desktop application with the administrative advantages of the Internet. Formerly, the client-server framework powered many Internet related applications. In the client-server paradigm, the client computer acts mostly as a display unit. The majority of processing occurs remotely on the server, while the results are displayed on the client. While this functionality extends the powerful processing of large centralized servers to individual users, network latency leads to delays in the operation of client-server applications. Even with the large increases in available high speed bandwidth, network latency still exists.

RIAs, however, provide for much of the processing to be completed on the client computer. The RIAs are stored remotely on Internet-accessible servers. When the client requests access, the computer logic defining the RIA, or at least large portions thereof, is downloaded and run completely on the client computer. Desktop and handheld computers have become faster and more powerful, and with large amounts of storage space. Therefore, complex data and rich graphics may be processed and rendered quickly. Moreover, because of the prevalence and speed of today's Internet access, these RIAs may be continually updated with data in order to provide a rich graphical and informational experience in a real-time world.

Because RIAs typically rely on rich graphical presentation, graphically-oriented containers are generally used on each client to run the rich application. For example, interactive information and graphical players, such as MACROMEDIA INC.'s MACROMEDIA FLASH™ PLAYER, SUN MICROSYSTEM's JAVA™ VIRTUAL MACHINE™π (JVM™), and the like, are used to execute RIAs on the client. These interactive, information and graphical players typically run monolithic files, such as Small Web File (SWF) format for MACROMEDIA MACROMEDIA FLASH™ PLAYER and JAVA™ applets for the JVM™. SWF files and JAVA™ applets generally consist of bytecode that runs on the virtual machine of the player. The use of virtual machines increases the cross-platform compatibility of such applications. Software manufacturers, such as MACROMEDIA, INC., SUN MICROSYSTEMS, INC., MICROSOFT CORPORATION, and the like, create different virtual machines to play on various different computer platforms. However, the bytecode format remains constant and compatible with its designed player, while the player is customized to the particular computer platform.

When a user selects to access a RIA, the underlying bytecode is downloaded to the user's computer for execution on the graphical player. Merely downloading the bytecode file to the user's computer takes relatively little time, at least over a broadband Internet connection. Once there, each piece of bytecode directs the multimedia player to perform some single step or single function of the application, such as creating objects that may then be rendered onto the display by the players. While the execution of a few steps also does not typically take much time, the execution of all of the bytecode to instantiate and render each of the graphical interface elements in addition to the download time creates a substantial delay in the user's experience of the RIA. Once this process has completed, interaction with the RIA is extremely fast. However, the initial start-up delay may be long enough to cause many users to quit the RIA before even being able to access it. Thus, the current solutions for delivering high quality RIA based on declarative languages provide a less than desirable experience for the user at start up.

BRIEF SUMMARY OF THE INVENTION

Representative embodiments of the present invention are directed to a system and method for deferring the instantiation of selected interface elements of a declarative software application until a user navigates to a particular location. As a declarative software application is downloaded to a client computer, a descriptive hierarchical data structure or descriptor tree of the application is developed. This descriptive hierarchical data structure merely describes the presentation of the visual elements and, therefore, utilizes much less processing overhead than the actual instantiation of each of the application's interface elements in the presentation container. Certain visual elements, such as menu items, typically provide immediate access to user interactions, and therefore, are instantiated in advance. However, in certain stacked navigation elements, such as tabbed or accordioned groups of panes or views, typically only the active pane or view is visible to the user at any one time. Therefore, instantiation of the objects resident on the hidden panes or views is generally unnecessary until the user navigates to the hidden pane or view.

In operation, the initially visible elements of the application are fully rendered and displayed within the presentation container while the initially unseen elements in the descriptive hierarchical data structure or descriptor tree remain descriptive. The multimedia player rendering the visible display elements uses an object tree created from the descriptor tree to render the visual elements. The nodes of the hierarchical outline, as well as the object tree, that represent stacked visual elements are created according to a user's navigation. Therefore, the user experiences a limited delay at start up. For example, if each view takes half of a second to be instantiated, the user experiences the half-second delay as opposed to the much longer display should all of the views of the application be instantiated before execution begins. If there were 100 views in the application, a half-second per view delay would translate into a 50 second delay at start up.

Once interface elements are instantiated, they remain instantiated in memory. Therefore, as the user continues to navigate through the application, more of the hierarchical outlines becomes instantiated allowing the graphical player to re-render each interface element very quickly when the user returns to any previously viewed pane or view. Furthermore, each subsequent navigation to one of the previously viewed interface elements is delivered without the initial instantiation delay, thus, further improving the user's interaction experience with the application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3A is a block diagram illustrating another embodiment of the present invention;

FIG. 5 is a flowchart illustrating steps taken in implementing an additional embodiment of the present invention; and FIG. 6 is a flowchart illustrating steps taken in implementing an additional or alternative embodiment of the present invention

DETAILED DESCRIPTION OF THE INVENTION

Figure 1:
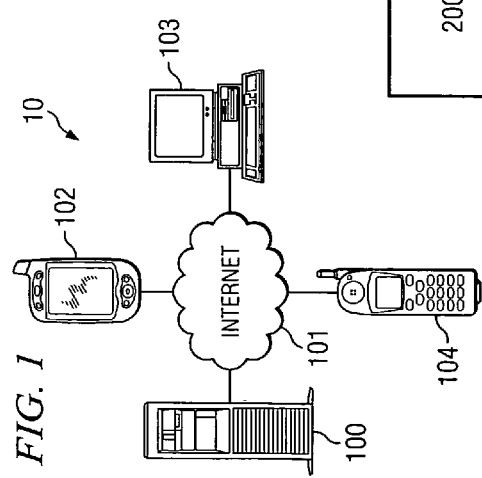
FIG. 1 is a block diagram illustrating framework 10 suitable for delivering rich or thin applications to client users.

FIG. 1 is a block diagram illustrating framework 10 suitable for delivering rich or thin applications to client users 102-104. Server 100 maintains a remote application that may be delivered to one or more of clients 102-104 over Internet 101. For purposes of describing the various embodiments of the present invention, framework 10 is used in delivering a RIA to clients 102-104. In operation, client 102 may access server 100 over Internet 101 to request use of a RIA. Server 100 responds by transmitting the RIA back to client 102, again using Internet 101.

Figure 2:
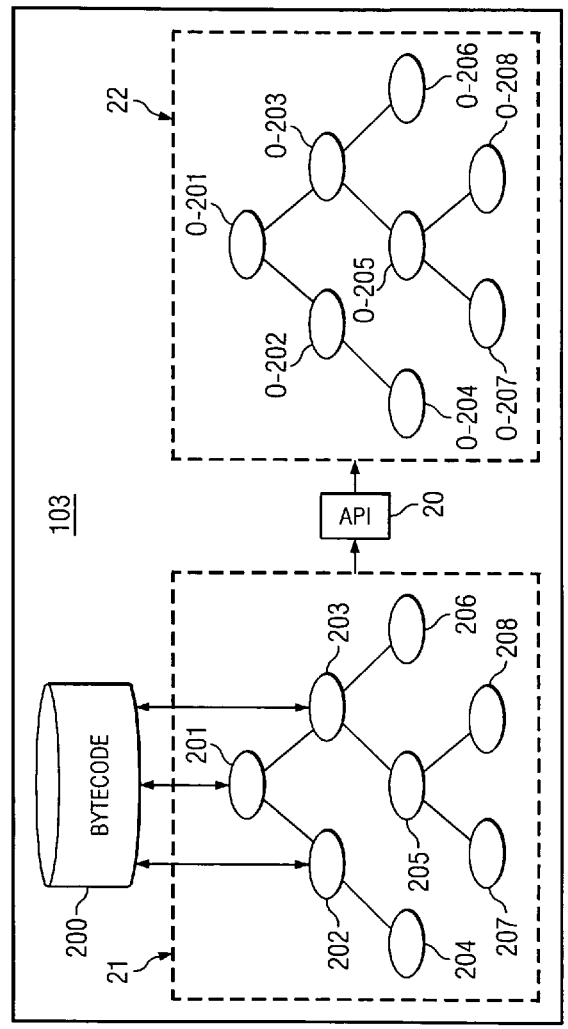
FIG. 2 is a block diagram illustrating one embodiment of the present invention.

FIG. 2 is a block diagram illustrating one embodiment of the present invention. A user at computer 103 accesses a RIA developed according to one embodiment of the present invention. For example, the RIA may have been developed using MACROMEDIA INC.'s MXML™ development language. The MXML™ file defining the RIA is compiled into a SWF file and cached at the remote server. When the user points the browser to the RIA, the corresponding SWF file is downloaded to computer 103 and executes the SWF using its compatible graphics player, for example the MACROMEDIA INC.'s MACROMEDIA FLASH™ player. The SWF file contains bytecode storage 200 that will be eventually used by the MACROMEDIA FLASH™ player to implement the RIA. However, instead of completely executing the bytecode in bytecode storage 200 on the MACROMEDIA FLASH™ player to directly create each object in the object tree that is to be rendered for the RIA on the player, which would cause an unacceptable delay in execution, intermediate processing steps are performed to decrease this delay.

The SWF file and its bytecode in bytecode storage 200 initiate the creation of descriptor tree 21, which will eventually be constructed of application descriptor node 201 and descriptor nodes 202-208. A descriptor node is a data structure that contains descriptions for a single object or single container of the RIA. The description comprises the properties of each object or the properties of each container that the node represents. This description may closely resembles the code structure written in the declarative language, such as MXML™ which was used in developing the example depicted in FIG. 2. In normal application, a developer, using MXML™ in the present example, will only define the object properties that vary or differ from default properties of the particular objects. Objects represent any type of screen item such as a pane container, buttons, fill-in fields, menus, navigators, and the like. For example, the developer may define the text of a button label in MXML™. This defined text would then be included in the button object descriptor for that button. Similarly, the background color, width, and height for a container, and the like, may be included in the descriptor node representing the container object. The descriptor nodes for these objects would, therefore, include the descriptions of the properties defined in the MXML™ code that vary from the default properties of those objects.

In contrast, the actual object, which the graphical player uses to render the graphical representation on its display, contains not only the custom properties of the object, but also each and every other property within the default definition of that object. Therefore, the object that is used by the graphical player contains much more data and information than its descriptor. The smaller amount of data and information in the intermediate descriptor node decreased the amount of time to transmit the bytecode for it across Internet 101.

The first node in descriptor tree 21 that is created by the SWF and the bytecode in bytecode storage 200 is application descriptor node 201. Application descriptor node 201 includes a description of the properties of the application plus child constructor methods for creating each of the child nodes of application descriptor node 201. These child constructor methods are code logic that contain pointers to specific bytecode in bytecode storage 200 that the graphical player engine uses to create each of the descriptor child nodes of application descriptor node 201, descriptor nodes 202 and 203. Similarly, descriptor nodes 202 and 203 each have described properties and their own child constructor methods with pointers to bytecode storage 200 for creating their children, descriptor nodes 204-206. Thus, each descriptor node in descriptor tree 21 includes property descriptions for its representative object or container object and, possibly, a child constructor method that points to some bytecode in bytecode storage 200 for creating its children, if any such children exist.

In example operation, descriptor node 202 may represent a container that ultimately represents a pane displayed by the graphical player. Descriptor node 202 would, therefore, contain descriptions such as, among others, the pane height and width along with a background color and a child constructor method to create descriptor node 204. Descriptor node 204 may represent a button located on the pane described by descriptor node 202. Because descriptor node 204 represents a visible object within the pane represented by descriptor node 202, the child constructor method of descriptor node 202 is called and executed to create descriptor node 204. Descriptor node 204 may then include the button text, possibly a button color, or the like.

Descriptor node 203 may represent a tab navigation container (i.e., a tabbed pane). Descriptor node 203 would include its property descriptors such as height, width, background color, and the like, and the child constructor methods for constructing descriptor nodes 205 and 206, which may represent the containers for each of the tabs in the tabbed navigation container. Because descriptor nodes 205 and 206 represent the child views of the tabbed navigation container, it is known that only the contents of one of those views will be visible to the user at any one time when it is rendered on the display by the graphical player. Thus, the views in the tabbed navigation container are stacked in relation to each other. As a result, the child constructor methods are called first only for descriptor node 205 to create descriptor nodes 207 and 208, which may represent a button and possibly a text box to be displayed on the first view of the tabbed pane that will be rendered and displayed by the graphical container. Therefore, any children that descriptor node 206 may have are not instantiated when the user is viewing the first view of the tabbed pane represented by descriptor nodes 203, 205, 207 and 208. This delaying or deferring the instantiation of the hidden object descriptors in such stacked navigation objects saves processing time and increases the speed with which the application is rendered and displayed to the user. If a user were to navigate then to the tab view represented by descriptor node 206, the child descriptor methods of descriptor node 206 may be called to generate any child descriptor nodes that it may have. These child nodes would represent the contents of that view.

It should be noted that in various alternative and additional embodiments of the present invention, various methods may be used to note the information of whether a particular object is a stacked or unstacked object. For example, the information that a particular object or container object is stacked or unstacked may be contained in descriptor node 203, which may indicate itself as a stacked container. Similarly, the information may be contained in each of descriptor nodes 205 and 206, which may indicate that they are members of a stacked object. Various embodiments of the present invention may implement this information in a number of different ways.

In practice, in order to graphically render the RIA on the display, the descriptor nodes of descriptor tree 21 are converted into object nodes that contain every one of the object properties that the graphical player uses to render the visual elements onto the display. As each of the descriptor nodes of descriptor tree 21 is created, the descriptor node is processed by application programming interface (API) 20, which converts the description into the renderable object within object tree 22. Thus, descriptor tree 21 and object tree 22 are created and unfolded in parallel. The graphical player then uses each of object nodes O-201-O-208 to render the visual elements for the RIA onto the display of computer 103.

It should be noted that any order of converting the descriptor nodes of descriptor tree 21 into the object node of object tree 22 may be employed. For example, a descriptor node may be processed by API 20 immediately after its creation, or may be processed after completing the creation of each descriptor node of a particular tree level, or may be processed after completing the creation of each descriptor node in the deferred version of descriptor tree 21.

FIG. 3A is a block diagram illustrating another embodiment of the present invention. RIA 300 is typically programmed in a language that defines high user interactivity and graphical presentation, such as MACROMEDIA INC.'s MXML™. RIA 300 is then compiled by compiler 314 on remote server 301 to produce the executable file that will render RIA 300. The executable file may then be stored in RIA storage 315 that may be accessible by users desiring to operate RIA 300. A user at computer device 302 accesses remote server 301 over Internet 101 to select execution of RIA 300. The executable file stored in RIA storage 315 is then generally downloaded to computer device 302 for operation. Computer device 302 includes multimedia player 32, which executes the executable file downloaded from remote server 301. An example of multimedia player 32 may be MACROMEDIA INC.'s MACROMEDIA FLASH™ player.

Display 34 illustrates the view that the user first views on the start up of RIA 300 on computer device 302. RIA 300 is represented by the visual rendering of application pane V-303. Application pane V-303 includes container V-305 that has two buttons, buttons V-308 and V-309. Application pane V-303 also includes tabbed navigation container V-304 that has two tab views, tab view V-306, which is shown with buttons V-310 and V-311, and tab view V-307, which is concealed under tab view V-306 in the navigation stack. However, in order to get to this point visually on display 34, multimedia player 32 first creates descriptor tree 30 and object tree 31.

When the executable file is received at computer device 302, multimedia player 32 begins execution by creating application descriptor node 303. Application descriptor node 303 represents RIA 300. API 20 then converts application descriptor node 303 into application object O-303 of object tree 31. Application object O-303 is then used by virtual machine 33 to render the background, color, size, shape, and various other properties of application pane V-303 on display 34. After calling the child constructor methods of application descriptor node 303, multimedia player 32 then causes the creation of descriptor nodes 304, representing tabbed navigation container V-304 and descriptor node 305, representing container V-305. API 20 converts descriptor nodes 304 and 305 into object nodes O-304 and O-305, which virtual machine 33 uses to render tabbed navigation container V-304 and container V-305.

Descriptor node 306 and 307 are created from descriptor node 304, which represent tab views V-306 and V-307 of tabbed navigation container V-304. Similarly, descriptor nodes 308 and 309 are created which represent buttons V-308 and V-309 of container V-305. API 20 converts each of descriptor node 306-309 into their corresponding object nodes O-306-O-309, which virtual machine 33 uses to render tab views V-306 and V-307 of tabbed navigation container V-304 and buttons V-308 and V-309 of container V-305, respectively.

In the embodiment shown in FIG. 3A, descriptor node 304 contains information that tells multimedia player 32 that it represents a stacked object. Therefore, multimedia player 32 determines which of the tabbed views is on top of the stack. Because tab view V-306 is shown on display 34, multimedia player 32 causes descriptor nodes 310 and 311 to be created from descriptor node 306. Descriptor nodes 310 and 311 represent buttons V-310 and V-311 shown on tab view V-306. API 20 converts each of descriptor node 310-311 into their corresponding object nodes O-310-O-311, which virtual machine 33 uses to render buttons V-310 and V-311 on tab view V-306. At this point, because each of the visual elements visual to the user have been rendered on display 34, instantiation of the interface elements of RIA 300 temporarily ceases while the user remains on the view shown in application pane V-303.

Figure 3B:
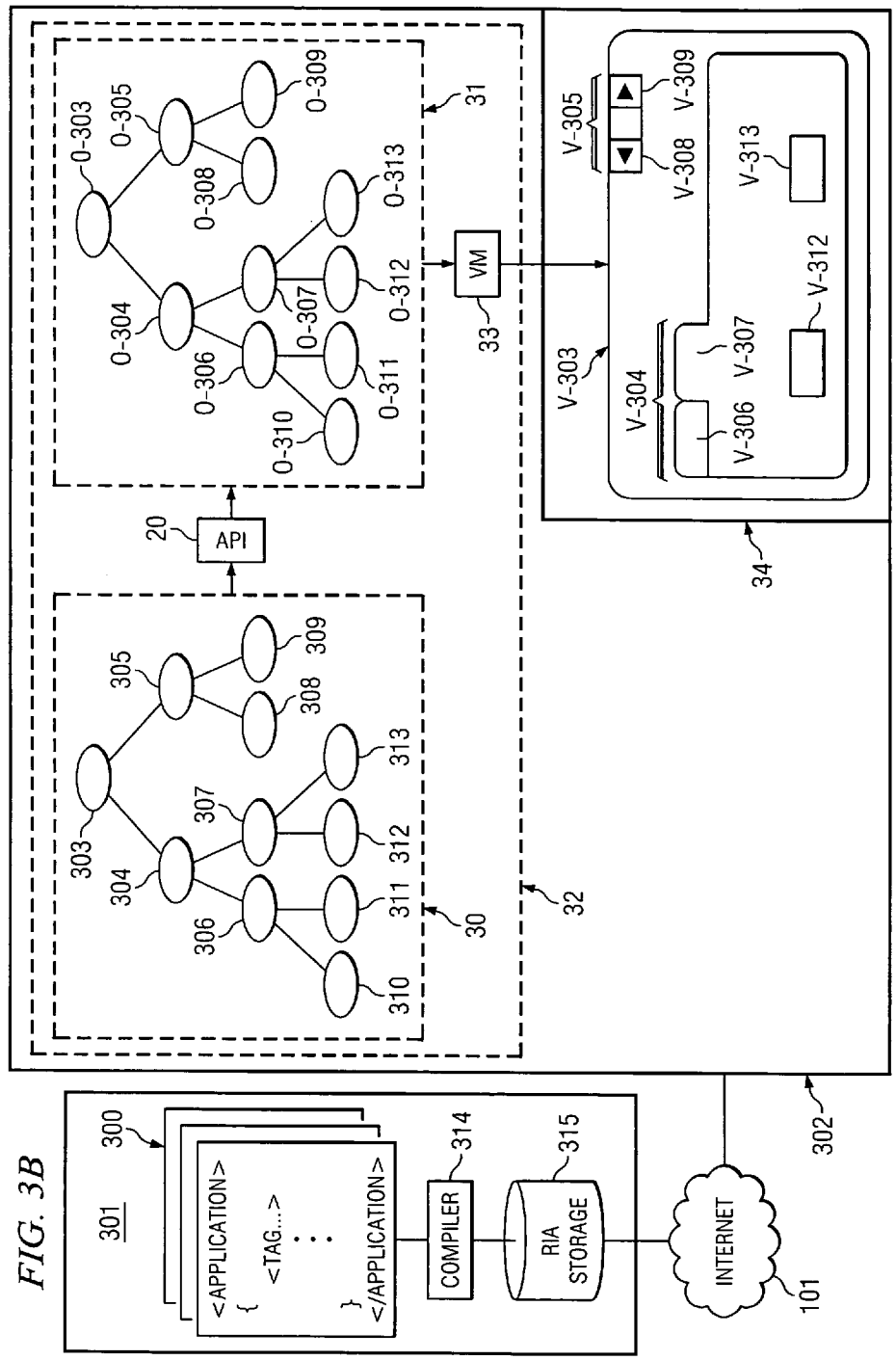
FIG. 3B is a block diagram illustrating another embodiment of the present invention after a user has navigated deeper into RIA.

FIG. 3B is a block diagram illustrating another embodiment of the present invention after a user has navigated deeper into RIA 300. From the view shown in FIG. 3A, the user selects the tab button to navigate to the second view of tabbed navigation container V-304. In doing so, application pane V-303 changes as shown in FIG. 3B. Now, tabbed navigation container V-304 shows tab view V-307 on display 34. When the user selected the tab for tab view V-307, multimedia player 32 caused the creation of descriptor nodes 312 and 313 from descriptor node 307. API 20 then converted descriptor nodes 312 and 313 into object nodes O-312 and O-313 in object tree 31. Virtual machine 33 used object nodes O-312 and O-313 to render buttons V-312 and V-313 onto tab view V-307 of tabbed navigation contain V-304. The user experiences a slight navigation delay while descriptor nodes 312 and 313, and object nodes O-312 and O-313 are instantiated, and further while object nodes O-312 and O-313 are rendered as buttons V-312 and V-313. However, by delaying the instantiation of the interface elements until a user navigates to a particular view, the time for starting up RIA 300 is reduced.

FIG. 3B illustrates descriptor nodes 310 and 311, as well as object nodes O-310 and O-311 remaining within multimedia player 32. Once instantiated, the objects remain in memory to increase the efficiency of future navigation back to the views that have already been displayed to the user on display 34.

Figure 4:
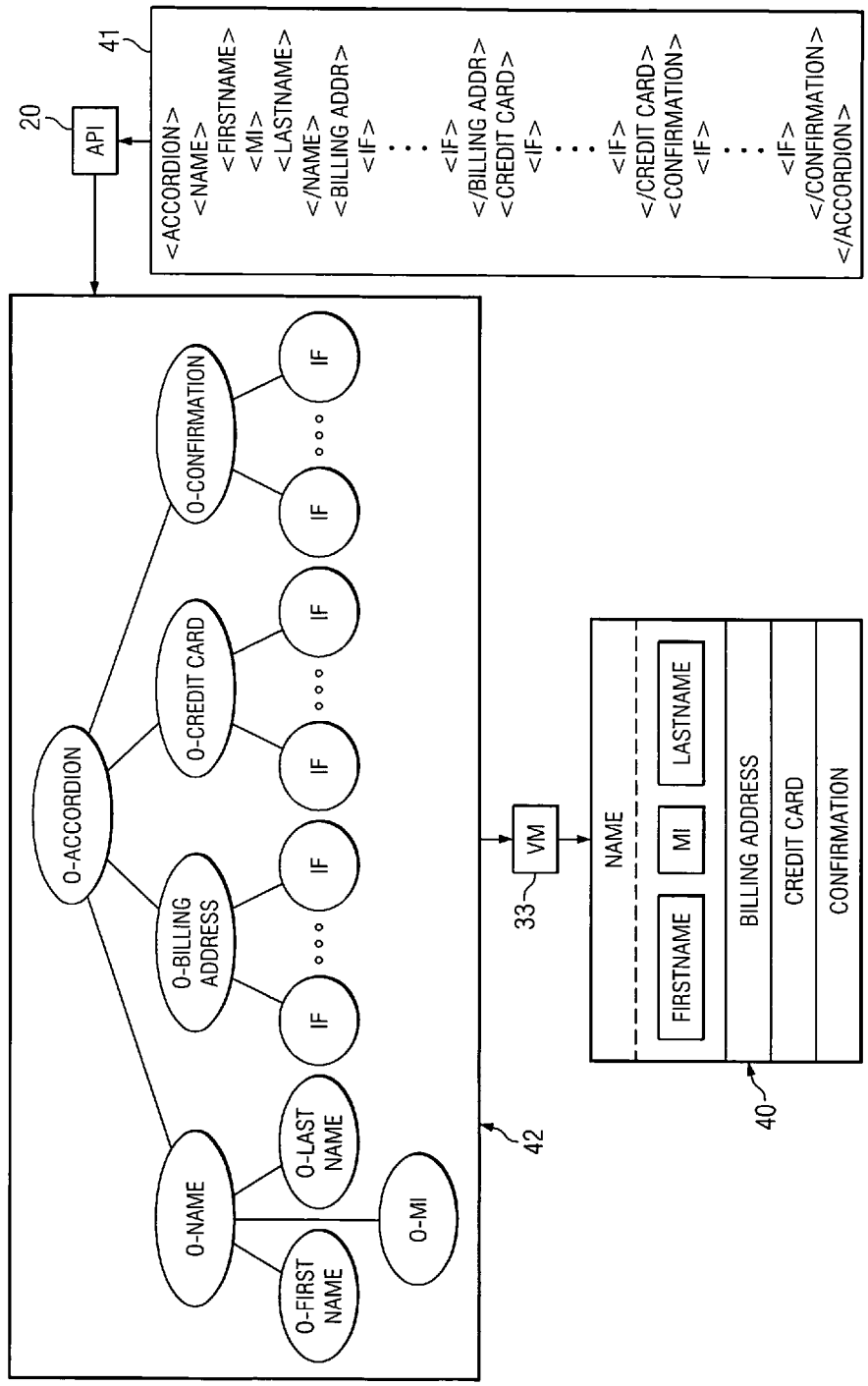
FIG. 4 is a block diagram of navigational element 40 with associated object tree 42 and descriptor tree 41 configured according to another embodiment of the present invention.

FIG. 4 is a block diagram of navigational element 40 with associated object tree 42 and descriptor tree 41 configured according to another embodiment of the present invention. Navigational element 40 is depicted as an accordion navigator with four interface views named Name, Billing Address, Credit Card, and Confirmation. Navigational element 40 may be one of several navigational elements within a larger application. Descriptor tree 41 is a pseudocode representation of a descriptor for the accordion container of navigational element 40. In the embodiment shown in FIG. 4, when the user first navigates to navigational element 40, the backgrounds for each of the four interface views is initially instantiated from descriptor tree 41. API 20 converts the descriptions of each of the accordion views into rendering objects for object tree 42. For example, descriptor view Name is converted by API 20 into object O-Name in object tree 42. Virtual machine 33 then uses O-Name to render the visual elements of the Name view in accordion navigational element 40.

Because the Billing Address, Credit Card, and Confirmation views are each lower in the stack than the Name view, API 20 only creates objects O-FirstName, O-MI, and O-LastName for object tree 42, which are then used by virtual machine 33 to render the interface elements on navigational element 40, FirstName, MI, and LastName. If the user moves to a subsequent accordion view, the objects corresponding to the descriptors of the interface elements contained in the view to which the user has navigated, are created by API 20, after which virtual machine 33 uses these objects to render the interface elements on those subsequent views. As the user selects to view Name from one of the subsequent views, virtual machine 33 renders the interface elements of view Name from the corresponding objects that are now in memory.

It should be noted that, in various additional and alternative embodiments of the present invention, selected stacked objects or views may be designated to be fully instantiated regardless of whether the stacked panes or views are visible in the current view.

In should be noted that, in various other additional and alternative embodiments of the present invention, the descriptor nodes and object nodes for interface elements may be pre-instantiated according to other relationships with the currently visible pane, such as a direct link (i.e., a link that typically traverses between two panes or views using only a single user action, such as a single mouse click), an ordinal relationship (i.e., the panes are ordered in a specific order, in which the interface elements of the next view or pane in the order would be pre-instantiated), a statistical relationship (i.e., statistical calculations are performed on users' interactions with the particular RIA or other application to "predict" which of the next views the user is likely to navigate to, in which the interface elements for that likely next view would be pre-instantiated), a positional relationship (i.e., particular views are positioned in some kind of hierarchical or ordinal relationship with the currently visible pane, in which case the interface elements of those closely positioned views would be pre-instantiated), or the like. In such embodiments, the descriptor nodes and object nodes for the interface elements for those related views may be instantiated during "processing" or thinking time in the current view.

FIG. 5 is a flowchart illustrating steps taken in implementing an additional embodiment of the present invention. In step 500, a descriptor tree is generated having a plurality of descriptor nodes, responsive to beginning the RIA, wherein each of the plurality of descriptor nodes describes one or more visible interface elements of the RIA visible at the beginning of the RIA. One or more hidden descriptor nodes is created in the descriptor tree, in step 501, describing the one or more hidden interface elements responsive to a user navigating to the one or more hidden interface elements. In step 502, the one or more visible interface elements and the one or more hidden interface elements are rendered using the corresponding ones of the plurality of descriptor nodes and the one or more hidden descriptor nodes.

FIG. 6 is a flowchart illustrating steps taken in implementing an additional or alternative embodiment of the present invention. In step 600, executable code is downloaded representing the RIA to a computer of the user responsive to the beginning of the RIA, wherein the generating and the creating use the executable code. A descriptor tree having a plurality of descriptor nodes is generated in step 601, responsive to beginning the RIA, wherein each of the plurality of descriptor nodes describes one or more visible interface elements of the RIA visible at the beginning of the RIA. In step 602, the plurality of descriptor nodes is converted into a plurality of detail objects. One or more hidden descriptor nodes is created in the descriptor tree, responsive to a user navigating to the one or more hidden interface elements, in step 603, describing the one or more hidden interface elements, wherein the one or more hidden descriptor nodes created has a navigational relationship, such as a direct link, an ordinal relationship, a statistical relationship, a positional relationship, and the like, with a particular one of the one or more hidden interface elements to which the user navigates. In step 604, the one or more hidden descriptor nodes is converted into one or more hidden detail objects. The one or more visible interface elements and the one or more hidden interface elements are rendered in step 605 using the corresponding ones of the plurality of detail objects and the one or more hidden detail objects.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer program product having a non-transitory computer readable medium embodying program code executable by a computing device, said computer program product comprising:
   code for initializing of a rich internet application (RIA), wherein initializing comprises instantiating, at a computing device accessing the computer readable medium, at least one visible element in said RIA and deferring instantiation of unseen ones of a plurality of stacked elements in said RIA;
   code for generating, at the computing device, a descriptor tree having a plurality of descriptor nodes, wherein each of said plurality of descriptor nodes describes an instantiated and visible interface element of said RIA;
   code for creating one or more stacked descriptor nodes in said descriptor tree describing said unseen ones of said plurality of stacked interface elements responsive to a user navigating to said unseen ones, wherein said unseen ones are not instantiated at said initializing; and
   code for rendering a graphical representation of said plurality of visible interface elements and said unseen ones at a display connected to the computing device, the graphical representation rendered by using the descriptor tree to identify corresponding ones of:
   said plurality of descriptor nodes; and
   said one or more stacked descriptor nodes.

2. The computer program product of claim 1 further comprising:
   code for converting said plurality of descriptor nodes into a plurality of detail objects;
   code for converting said one or more stacked descriptor nodes into one or more stacked detail objects, wherein said plurality of instantiated and visible interface elements and said unseen ones are rendered directly using said plurality of detail objects and said one or more stacked detail objects.

3. The computer program product of claim 2 further comprising:
   code for storing as a plurality of stored nodes each of:
   said plurality of descriptor nodes;
   said one or more stacked descriptor nodes; said plurality of detail objects; and
   said one or more stacked detail objects; and
   code for re-rendering each of said plurality of instantiated and visible interface elements and said one or more stacked interface elements from said plurality of stored nodes.

4. The computer program product of claim 1 wherein each one of said plurality of descriptor nodes and said one or more stacked descriptor nodes contains a software method for generating each its child nodes.

5. The computer program product of claim 1 further comprising:
   code for downloading bytecode representing said RIA to a computer of said user responsive to said initializing of said RIA, wherein said code for generating and said code for creating use said bytecode.

6. The computer program product of claim 1 wherein said one or more stacked descriptor nodes created has a navigational relationship with a particular one of said one or more stacked interface elements to which said user navigates.

7. The computer program product of claim 6 wherein said navigational relationship comprises one or more of:
   a direct link;
   an ordinal relationship;
   a statistical relationship; and a positional relationship.

8. The computer program product of claim 1 further comprising:
   code for creating select ones of said one or more stacked descriptor nodes in said descriptor tree responsive to initializing said RIA.

9. The computer program product set forth in claim 1, wherein the descriptor tree comprises a hierarchical data structure comprising an application descriptor node, the application descriptor node including a child constructor method for creating a child node of the application descriptor node, the child constructor method comprising code logic containing a pointer to code of the rich internet application.

10. A computer program product having a non-transitory computer readable medium embodying program code executable by a computing device, said computer program product comprising:
   program code for accessing, at a computing device, executable code of a rich internet application, the executable code comprising code for instantiating a plurality of objects, each object for rendering a corresponding interface element of the rich internet application;
   program code for creating, at the computing device and in response to accessing, a descriptor tree comprising a plurality of descriptor nodes, each node identifying an object or container of the application, the descriptor tree created based on the accessed code;
   program code for identifying, at the computing device, a subset of the plurality of objects in the executable code, the subset comprising fewer than all of the plurality of objects, wherein identifying the subset comprises (i) using the descriptor tree to identify a node whose object is for rendering an interface element that is not visible in the initial view and (ii) excluding the object from the subset of objects;
   program code for instantiating, at the computing device, the objects in the subset in response to identifying the subset of objects;
   program code for rendering, at a display connected to the computing device, a graphical representation showing an initial view of the application, the graphical representation rendered using the instantiated subset of objects;

program code for instantiating, at the computing device, at least one other object of the plurality of objects in response to user interaction with an interface element of the initial view; and program code for rendering, at the display connected to the computing device, a second graphical representation showing another view of the application, the second graphical representation rendered using the instantiated at least one other object.

11. The computer program product set forth in claim 10, wherein using the descriptor tree to identify a node whose object is for rendering an interface element that is not visible in the initial view comprises:

determining if the node identifies itself as corresponding to a stacked navigation object.

12. The computer program product set forth in claim 10, wherein creating a descriptor tree comprising identifying a node whose object is for rendering an interface element that is not visible in the initial view as a hidden node; and wherein objects associated with hidden nodes are excluded from the subset.

13. The computer program product set forth in claim 10, wherein the descriptor tree comprises a hierarchical data structure comprising an application descriptor node, the application descriptor node including a child constructor method for creating a child node of the application descriptor node, the child constructor method comprising code logic containing a pointer to code of the rich internet application.

14. A method comprising:

accessing, by a computing device, code of a rich internet application from a computer-readable medium;

in response to accessing, generating, by the computing device, a descriptor tree based on the accessed code, the descriptor tree having a plurality of descriptor nodes corresponding to respective elements of the rich internet application, at least some of the descriptor nodes identifying interface elements of the rich internet application intended to be instantiated and visible at a beginning of the rich internet application;

creating, by the computing device, at least one hidden descriptor node in the descriptor tree, the hidden node identifying an interface element not intended to be instantiated or visible at the beginning of the rich internet application;

instantiating, by the computing device, a plurality of interface elements at the beginning of the rich internet application based on identifying corresponding non-hidden nodes in the descriptor tree;

rendering a first graphical representation using the instantiated plurality of interface elements;

responsive to data identifying navigation in the rich internet application, instantiating, by the computing device a second interface element based on a corresponding hidden descriptor node and rendering a second graphical representation using the instantiated second interface element, wherein instantiation of the second interface element and rendering the second graphical representation are deferred until the navigation occurs.

15. The method set forth in claim 14, wherein each of the descriptor nodes contain a software method for generating each of its child nodes, if any.

16. The method set forth in claim 14, further comprising prior to accessing the executable code, downloading the code.

17. The method set forth in claim 14, wherein the descriptor tree comprises a hierarchical data structure comprising an application descriptor node, the application descriptor node including a child constructor method for creating a child node of the application descriptor node, the child constructor method comprising code logic containing a pointer to code of the rich internet application.

18. A system comprising:
a display device;
a memory; and
a processor,
wherein the memory embodies program code that configures the processor to:
access code of a software application,
based on the accessed code, generate a descriptive hierarchical structure of the application, the descriptive hierarchical structure comprising a plurality of descriptor nodes, the descriptive hierarchical structure comprising at least one first descriptor node that corresponds to an object used in rendering in an initial view of the application and at least one second descriptor node that corresponds an object used in rendering a second view of the application other than the initial view of the application,
use the descriptive hierarchical structure to identify the at least one first descriptor node and instantiate an object corresponding to the at least one first descriptor node,
render an initial view of the application by using the instantiated object to generate a graphical display for output using the display device,
receive input navigating to the second view, and
instantiate a second object corresponding to the at least one second node.

19. The system set forth in claim 18, wherein the descriptive hierarchical structure includes nodes corresponding to objects of a plurality of different views of the application.

* * * * *